(12) United States Patent
Benrashid et al.

(10) Patent No.: US 7,329,001 B2
(45) Date of Patent: Feb. 12, 2008

(54) METHODS FOR IMPROVING THE HYDROPHILICITY OF CONTACT LENSES AND CONTACT LENSES HAVING THE SAME

(75) Inventors: Ramazan Benrashid, Concord, NC (US); Ali Dahi, Carlsbad, CA (US); Jerome A. Legerton, San Diego, CA (US)

(73) Assignee: SynergEyes, Inc., Carlsbad, CA (US)

( * ) Notice: Subject to any disclaimer, the term of this patent is extended or adjusted under 35 U.S.C. 154(b) by 0 days.

(21) Appl. No.: 11/265,780

(22) Filed: Nov. 1, 2005

(65) Prior Publication Data

US 2007/0097315 A1    May 3, 2007

(51) Int. Cl.
    *G02C 7/04*    (2006.01)
(52) U.S. Cl. ............................. 351/160 H; 351/160 R
(58) Field of Classification Search ............ 351/160 H, 351/160 R
    See application file for complete search history.

(56) References Cited

U.S. PATENT DOCUMENTS

| 3,944,347 | A | * | 3/1976 | Barkdoll et al. ........ 351/160 R |
| 4,940,762 | A |  | 7/1990 | Powell |
| 5,070,166 | A | * | 12/1991 | Su et al. ..................... 526/301 |
| 5,162,469 | A | * | 11/1992 | Chen ........................... 526/245 |
| 5,409,731 | A |  | 4/1995 | Nakagawa |
| 5,726,733 | A |  | 3/1998 | Lai |
| 5,837,377 | A | * | 11/1998 | Sheu et al. ................. 428/412 |
| 2002/0016383 | A1 |  | 2/2002 | Iwata |
| 2004/0192872 | A1 |  | 9/2004 | Iwata |
| 2005/0018130 | A1 |  | 1/2005 | Dahi |

FOREIGN PATENT DOCUMENTS

WO    WO 86/04341    7/1986

OTHER PUBLICATIONS

Search Report for PCT/US2006/040610, mailed Aug. 1, 2007.

* cited by examiner

*Primary Examiner*—Scott J. Sugarman
*Assistant Examiner*—Darryl J. Collins
(74) *Attorney, Agent, or Firm*—Knobbe Martens Olson & Bear LLP

(57) ABSTRACT

The present invention relates to contact lenses manufactured using a gas permeable material with improved hydrophilicity. A method for improving the hydrophilicity of the contact lens includes providing a contact lens comprising a gas permeable contact lens material and exposing the material to a treatment solution comprising a chemical agent under conditions that are effective to significantly reduce the contact angle of the contact lens for a period of at least about two months. In another embodiment, the method includes irradiating the contact lens to sterilize the contact lens material. A contact lens manufactured using this method includes a substantially rigid portion comprising a polymeric material, the polymeric material comprising a hydrophilic surface having a contact angle of about 65 degrees or less.

14 Claims, 4 Drawing Sheets

METHODS FOR IMPROVING THE HYDROPHILICITY OF CONTACT LENSES AND CONTACT LENSES HAVING THE SAME

BACKGROUND

1. Field of the Invention

The present invention generally relates to contact lenses. More particularly, the present invention relates to methods for improving the hydrophilicity of contact lenses, and contact lenses having the same.

2. Description of the Related Art

Vision correction is on the verge of a revolution. New technologies to measure the aberrations or distortions in the optics of the eye will soon be available to the public. These new wavefront measurement techniques such as Shack-Hartmann wavefront sensing or Talbot Interferometry can precisely measure the eye's aberrations so that vision may be corrected up to 20/10. Wavefront sensing is the method for rapidly, and very accurately, assessing the aberrations in an individual's eye to create a customized prescription for correction.

However, once the eye's aberrations have been measured, either by conventional methods or by wavefront sensing, these measurements must then be transferred into a vision correction system, such as eye surgery, spectacles, or contact lenses. Recent advances in laser refractive surgery techniques such as LASIK and photorefractive keratectomy, as well as improvements in spectacle lens manufacturing now enable the creation of highly accurate corrective prescriptions for individuals.

However, this is not the case with contact lenses. Popular soft contact lenses cannot achieve the same result as spectacles or laser refractive surgery because of dimensional variations in fabrication. Rigid gas permeable (RGP) contact lenses, which may provide the platform to achieve the results of spectacles, are not as comfortable as soft contacts and lack the necessary positional stability on the eye.

Hybrid hard-soft contact lenses comprising a high Dk hard center portion and a relatively soft outer skirt have been developed to provide a platform for a corrective prescription and also provide the comfort of soft contact lenses.

One characteristic of contact lenses, both RGP and hybrid contact lenses, that is important to their level of comfort during use is the gas permeability of the contact lens material. Contact lens manufactures have usually attempted to increase gas permeability by adding silicon, styrene, fluorine, or a combination of these moieties to the contact lens material. However, these materials are hydrophobic and thus tend to have a high contact angle, and reduced or limited wettability of the lens. Wettability of the lens surface is important because it allows tears to fill the lens-corneal interspace. Further, wettability facilitates a uniform pre-lens tear film, thereby supporting the integrity of the optical characteristic of the front surface of the lens including subtle aberration structures manufactured thereon.

Existing ways of improving the wettability of contact lens surfaces include the periodical soaking of the contact lens in a conditioning cleaning solution and plasma charging of contact lens surfaces. However, such methods only temporarily improve the wettability of a contact lens. For example, plasma charging of contact lens surfaces generally provides improved wettability for 30 to 40 days, after which the material returns to its hydrophobic state.

With respect to conditioning cleaning solutions, a user must periodically remove the contact lenses and soak them in the solution for a period of time before wearing the lenses. Existing solutions only temporarily increase the wettability of the lens. However, a user must continue to periodically soak the contact lenses in the solution, which prevents the user from wearing the contact lenses for an extended period of time. This approach is inefficient since users may sometimes forget to clean their contact lenses. If the lenses are not periodically soaked, the user may experience increased discomfort from extended wear of the contact lenses.

Accordingly, there is a need for a contact lens with improved hydrophilicity and increased wettability that is long lasting, allowing for the continuous comfort wear of contact lenses.

SUMMARY

One aspect of at least one of the embodiments disclosed herein includes the realization that contact lenses, including hybrid contact lenses having a substantially rigid central portion and a substantially flexible peripheral skirt, can be designed to have increased and long-lasting wettability, providing an improved contact lens.

In accordance with one embodiment, a contact lens is provided comprising a substantially rigid portion comprising a polymeric material, the polymeric material comprising a hydrophilic surface having a contact angle of about 65 degrees or less.

In accordance with another embodiment, a contact lens is provided. The contact lens comprises a substantially rigid portion comprising a material selected from the group consisting of a polystyrene, a poly(fluoro-siloxane acrylate) and a poly(fluoro-siloxane styryl acrylate), the material comprising a surface having a contact angle of 65 degrees or less, wherein the contact angle remains substantially constant over a period of about six months or more.

In accordance with still another embodiment, a contact lens is provided comprising a substantially rigid central portion with a Dk greater than about $30 \times 10^{-11}$ [$cm^3$/sec][ml $O_2$/ml mm Hg], the substantially rigid central portion comprising a polymeric material, the polymeric material comprising a surface having a contact angle of 65 degrees or less. A substantially flexible peripheral portion is coupled to the substantially rigid central portion at a junction.

In accordance with yet another embodiment, a method for improving the hydrophilicity of a contact lens is provided. The method comprises providing a contact lens comprising a gas permeable contact lens material. The method also comprises exposing the material to a treatment solution comprising a chemical agent under conditions that are effective to significantly reduce the contact angle of the contact lens for a period of at least about two months.

Figure 1:
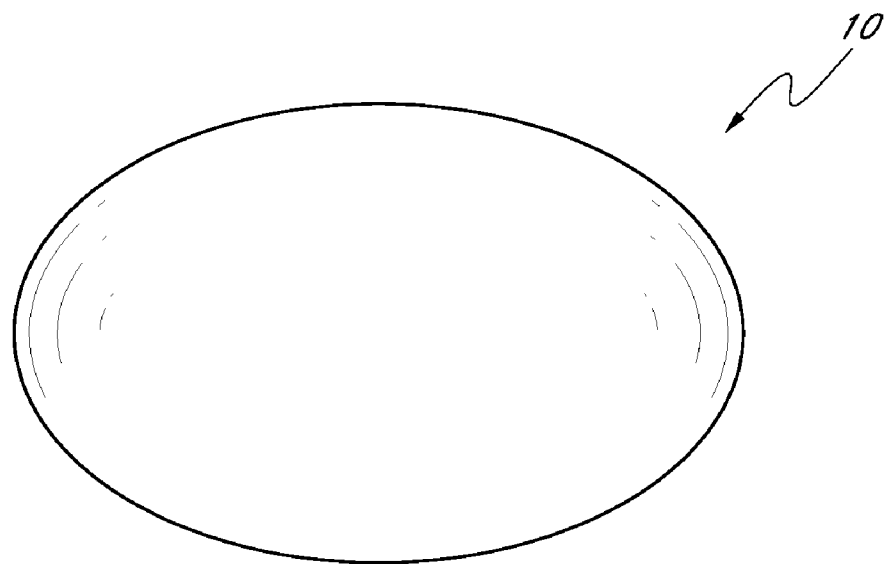
FIG. 1 is a perspective view of one embodiment of a rigid gas permeable (RGP) lens.

Throughout the figures, the same reference numerals and characters, unless otherwise stated, are used to denote like features, elements, components or portions of the illustrated embodiments. Moreover, while the subject matter of this application will now be described in detail with reference to the figures, it is done so in connection with the illustrative embodiments. It is intended that changes and modifications can be made to the described embodiments without departing from the true scope and spirit of the subject invention as defined in part by the appended claims.

DETAILED DESCRIPTION OF CERTAIN PREFERRED EMBODIMENTS

In the following detailed description, terms such as "curve," "curvature" and "curved surface" are interchangeable. Likewise, descriptive terms such as "substantially rigid" and "hard" and "substantially flexible" and "soft" are used interchangeably. Similarly, terms of sequence, such as "first" and "second," are used to simplify the description of the illustrated embodiments. Because other sequences are possible, however, the present invention should not be limited to the illustrated embodiments.

Figure 2:
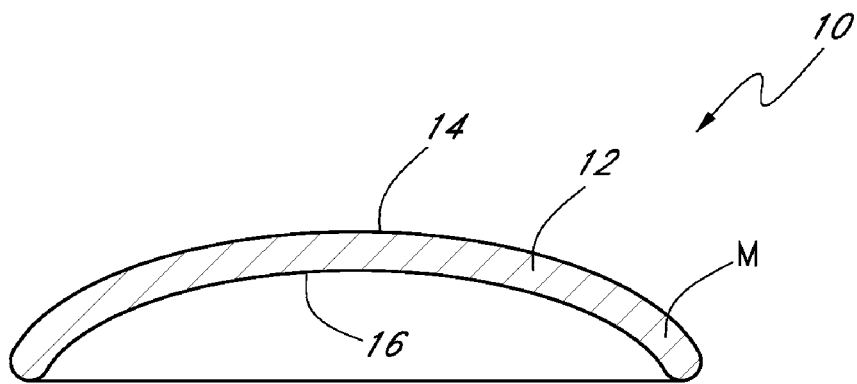
FIG. 2 is a cross-sectional view of the RGP lens of FIG. 1.

FIGS. 1 and 2 illustrate a rigid gas permeable (RGP) lens 10 having a substantially rigid portion 12 defined between an anterior surface 14 and a posterior surface 16 of the RGP lens 10. The contact lens 10 comprises a material, M, which may be substantially optically transmissive. In one embodiment, the RGP lens 10 is sized to cover the cornea of a human eye and at least a portion of its surrounding conjunctiva. The anterior and posterior surfaces 14, 16 are preferably curved. In one embodiment, the curvature of the anterior and posterior surfaces 14, 16 is substantially equal. In another embodiment, the curvature of the anterior surface 14 can differ from the curvature of the posterior surface 16.

Figure 3:
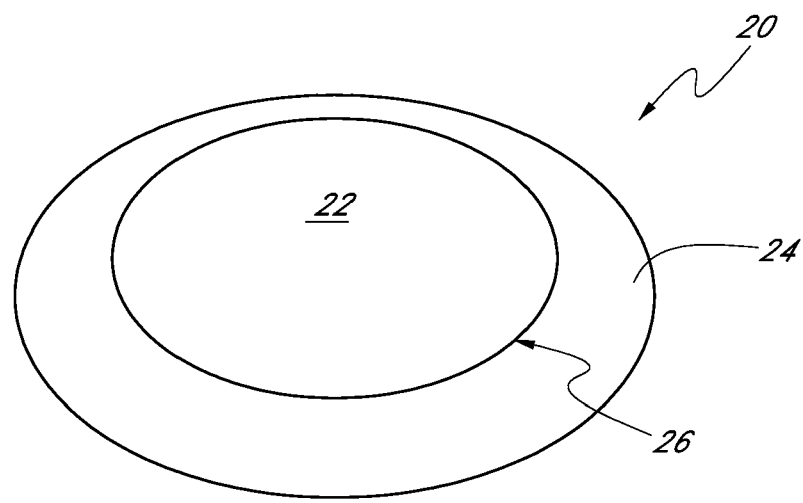
FIG. 3 is a perspective view of one embodiment of a hybrid contact lens (HCL) having a generally rigid central portion and a generally flexible peripheral portion.
Figure 4:
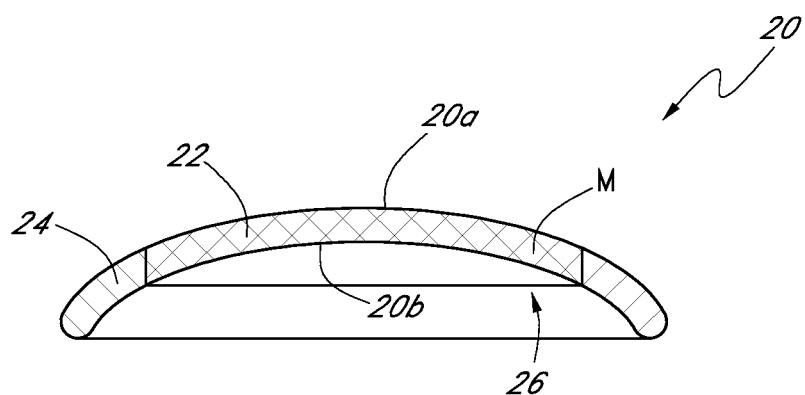
FIG. 4 is a cross-sectional view of the HCL lens of FIG. 3.

FIGS. 3 and 4 illustrate a hybrid contact lens (HCL) 20, having a substantially rigid portion or hard center 22 and a substantially flexible portion or soft peripheral skirt 24 defined between an anterior surface 20a and a posterior surface 20b. The hard center 22 and the soft peripheral skirt 24 are preferably coupled at a junction 26. In one embodiment, the soft peripheral skirt 24 is hydrophilic. In one embodiment, the HCL 20 is sized to cover the cornea of a human eye and at least a portion of its surrounding conjunctiva.

Preferably, the substantially rigid portion 12, 22 includes an oxygen permeable material. In one embodiment, the substantially rigid portion 12, 22 has a gas permeability (Dk value) greater than $30 \times 10^{-11}$ [$cm^3$/sec][ml $O_2$/ml mm Hg]. In another embodiment, the Dk value is greater than $150 \times 10^{-11}$ [$cm^3$/sec][ml $O_2$/ml mm Hg]. However other embodiments may have a gas permeability Dk value that may range between $30 \times 10^{-11}$ [$cm^3$/sec][ml $O_2$/ml mm Hg] and about $250 \times 10^{-11}$ [$cm^3$/sec][ml $O_2$/ml mm Hg].

In one preferred embodiment, the substantially rigid portion 12, 22 includes a material that comprises any one of the following groups: fluoro-siloxane acrylate groups, siloxane acrylate groups or poly-styrene siloxane acrylate groups. However, other suitable materials that provide the gas permeability characteristics discussed above can also be used, such as a polystyrene rigid gas permeable material. In another embodiment, the substantially rigid portion 12, 22 includes a polymeric material, such as a poly(fluoro-siloxane styryl acrylate) or a poly(fluoro-siloxane acrylate). In one embodiment, the substantially rigid portion 12, 22 includes MENICON Z material manufactured by Menicon Co., Ltd. of Japan. In another embodiment, the substantially rigid portion 12, 22 includes PARAGON HDS 100 material manufactured by Paragon Vision Sciences of Mesa, Ariz. In still another embodiment, the substantially rigid portion 12, 22 includes BOSTON XO material manufactured by Polymer Technologies, Inc., a subsidiary of Bausch and Lomb. In one preferred embodiment, the substantially flexible portion 24 includes a modified HEMA (poly-2-hydroxyethyl-methacrylate) material. However, other suitable materials for the substantially flexible portion 24 can also be used. Further discussion of suitable materials for the substantially rigid portion 12, 22 and the substantially flexible portion 24 is provided in U.S. application Ser. No. 10/657,061, filed Sep. 5, 2003, the entire contents of which are incorporated herein by reference and should be considered a part of this specification.

The contact lens 10, 20 can be manufactured using any suitable method, including the use of a mold, a block mold, a base curve mold and a base curve block mold. In one embodiment, a primary blank of substantially rigid gas permeable material can be lathed to produce a contact lens button. Further details on manufacturing methods for the hybrid contact lens 20 are provided in U.S. application Ser. No. 10/865,462, filed Jun. 9, 2004, the entire contents of which are hereby incorporated by reference in their entirety and should be considered a part of this specification.

The contact lens 10, 20 is preferably treated to improve its hydrophilicity and wettability. In one embodiment, the contact lens 10, 20 is treated during the manufacture process. For example, contact lens buttons can be treated following the lathing process. In another embodiment, the contact lens 10, 20 is treated following manufacture.

Figure 5:
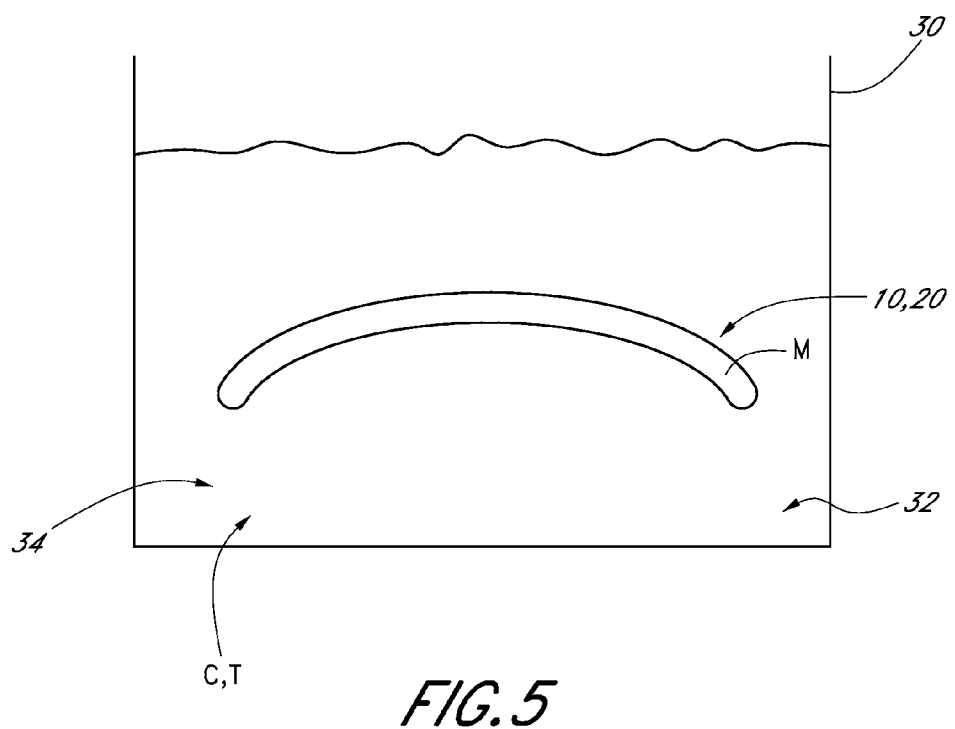
FIG. 5 is a schematic view of a system for improving the hydrophilicity of a contact lens, in accordance with one embodiment.

As shown in FIG. 5, the contact lens 10, 20, which includes one of the materials M discussed above, is treated with a chemical solution. The chemical solution can be an acidic or an alkaline solution. Preferably, the contact lens material M is exposed to a hydrolyzing agent under preselected conditions. In the illustrated embodiment, the contact lens 10, 20 is placed in a container 30 and soaked in a solution 32 containing a chemical agent 34. However, any suitable method for exposing the contact lens material M to the chemical agent 34.

The chemical agent 34 can be an acid or a base, such as a base of sodium, potassium and lithium metals or sodium, potassium, and lithium carbonate or bicarbonate. The solution 32 preferably has a pH of between about 0.5 and about 14. In one embodiment, the solution 32 has a pH of about 1.0. In another embodiment, the solution 32 has a pH of about 13.5. In one embodiment, the chemical agent 34 is sodium carbonate. In another embodiment, the chemical agent 34 is sodium bicarbonate. In another embodiment, the chemical agent 34 is sodium hydroxide. In another embodiment, the chemical agent 34 is ammonium hydroxide. In still another embodiment, the chemical agent 34 is phosphoric acid. However, the chemical agent 34 can include other suitable chemicals or combination of chemicals, including other organic and inorganic acids. In the illustrated embodiment, the chemical agent 34 is combined with water, such as deionized water.

In a preferred embodiment, the chemical agent 34 in the solution 32 has a concentration C of between about 1% and about 7% by weight based on total weight. In another preferred embodiment, the chemical agent 34 in the solution 32 has a concentration C of between about 2% and about 6% by weight based on total weight. In still another preferred embodiment, the chemical agent 34 in the solution 32 has a concentration C of about 4% by weight based on total weight. However, other concentration C values are possible. In another embodiment, the contact lens material M can be exposed to a chemical agent 34 having a first concentration, and then be exposed to another chemical agent 34 having a second concentration different from the first concentration.

The solution 32 to which the contact lens material M is exposed is preferably at a temperature T of between about 30° C. and about 85° C. In another preferred embodiment, the solution 32 is at a temperature T of between about 40° C. and bout 80° C. In still another preferred embodiment, the solution 32 is at a temperature T of about 37° C. In yet another embodiment, the solution 32 is at a temperature T of about 58.5° C. However, other exposure temperatures are possible. Additionally, in another embodiment, the contact lens material M can be exposed to a solution 32 having a first temperature, and then be exposed to another solution 32 having a second temperature different from the first temperature.

In a preferred embodiment, the contact lens material M is exposed to the solution 32 containing the chemical agent 34 for a period of between about 3 hours and about 40 hours. In another embodiment, the contact lens material M is exposed to the solution 32 for a period of between about 4 hours and about 36 hours. In still another embodiment, the contact lens material M is exposed to the solution 32 for a period of about 20 hours. In yet another embodiment, the contact lens material M is exposed to the solution 32 for a period of about 24 hours. However, other exposure periods are possible. Additionally, in one embodiment, the contact lens material M is exposed to the solution 32 during multiple intermittent periods.

In one embodiment, after the contact lens 10, 20 is exposed to the chemical agent 34 under the predetermined conditions, the chemical agent 34 is removed from the contact lens 10, 20 using a dilution process. The dilution process can include immersing the contact lens 10, 20 in deionized water during a plurality of water cycles. For example, the contact lens 10, 20 can be immersed in deionized water for a first period of time, after which the contact lens 10, 20 can be immersed in another volume of deionized water for a second period of time. In one embodiment, the dilution process includes immersing the contact lens 10, 20 in deionized water during three separate cycles. In another embodiment, the dilution process includes soaking the contact lens 10, 20 in deionized water for a period of between about 4 hours and about 24 hours. Though the dilution process described above includes the use of deionized water, the dilution process can employ other suitable dilution solutions.

In one embodiment treatment of the contact lens with the solution 32 results in the surface limited hydrolysis of the contact lens 10, 20. The hydrolysis process involves chemical cleavage of the ester linkage in the contact lens material M. Alkaline hydrolysis can be summarized with the following reaction:

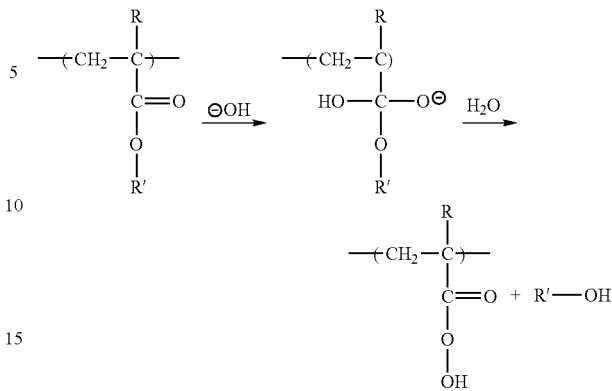

Similarly, acidic hydrolysis can be summarized with the following reaction:

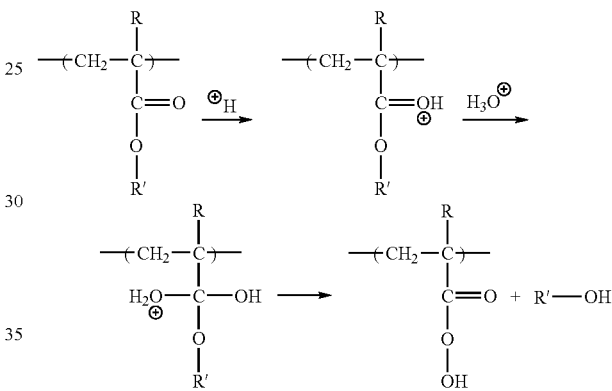

Though the contact lens material M of the substantially rigid portion 12, 22 may be hydrophobic, the hydrolysis process subjects the contact lens material M to contact with the chemical or hydrolyzing agent 34. For example, where the contact lens material M includes methacrylate ester linkages and is exposed to sodium hydroxide, the methacrylate groups on the surface hydrolyze to carboxylic or sodium carboxylate salt and alcohol. The low molecular weight alcohols resulting from hydrolysis go into alkaline (aqueous) solution but the larger polymerized fragment carries the hydroxyl (OH) groups. Increasing the concentration of carboxylic and hydroxyl groups on the surface of the contact lens material M enhances the hydrophilicity of the surface of the material. Increased hydrophilicity in the contact lens 10, 20 advantageously imparts more comfort to the contact lens wearer. The chemical cleavage of the ester linkage in the polymer resulting from the treatment of the contact lens material M with the hydrolyzing agent 34 (e.g., sodium hydroxide) may create carboxylic acid, carboxylate, and hydroxyl groups on the surface of the contact lens material M.

Figure 6A:
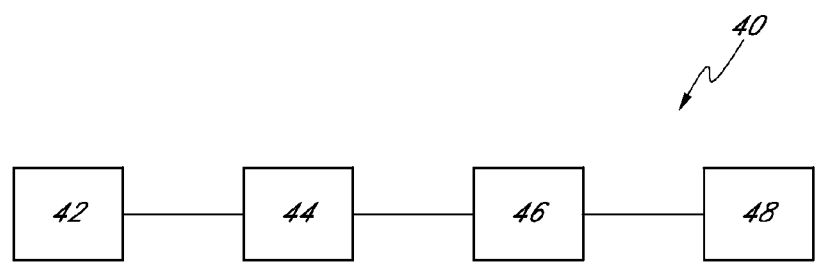
FIG. 6A is a block diagram of one embodiment of a method for improving the hydrophilicity of a contact lens.

FIG. 6A illustrates one method 40 for improving the hydrophilicity of the contact lens 10, 20. As discussed above, the contact lens 10, 20 can be treated during or after manufacture. The method 40 includes providing 42 the contact lens 10, 20, as discussed above. The method 40 also includes the step of treating 44 the contact lens 10, 20 material M with a solution 32 at a pre-selected temperature T and for a pre-selected period of time, wherein the solution 32 includes a chemical agent 34 at a pre-selected concentration C, in accordance with any of the embodiments discussed above.

In the illustrated embodiment, the method 40 also includes the step of soaking 46 the contact lens 10, 20 material M in water, such as deionized water for a pre-selected period of time. In one embodiment, the contact lens 10, 20 is soaked in deionized water for about 24 hours. In another embodiment, the contact lens 10, 20 is soaked in deionized water for a pre-selected period of time at the corresponding treatment temperature T. In another embodiment, the contact lens 10, 20 is further soaked in deionized water at room temperature for a period of between about 8 and 12 hours. In another embodiment, the contact lens 10, 20 is soaked in deionized water until a neutral pH is achieved.

The method 40 also includes the step of soaking 48 the contact lens 10, 20 material M in a saline solution having a pre-selected concentration. In one embodiment, the saline solution has a concentration of between about 0.5% and about 1.5% by weight based on total weight. In another embodiment, the saline solution has a concentration of about 0.9% by weight based on total weight.

Figure 6B:
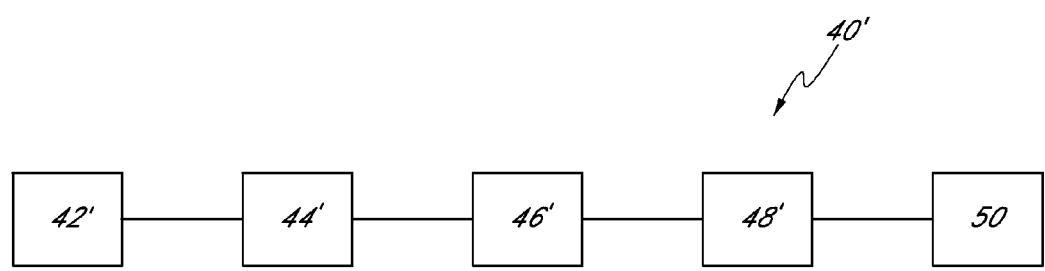
FIG. 6B is a block diagram of another embodiment of a method for improving the hydrophilicity of a contact lens.

FIG. 6B illustrates another method 40' for improving the hydrophilicity of the contact lens 10, 20. The method 40' is similar to the method 40 illustrated in FIG. 6A and so the identical reference numerals are used to identify similar method steps, except for the addition of a "'". The method 40' includes providing a contact lens 10, 20 material M 42', treating the contact lens material M 44' and soaking the material M 46', 48'.

Additionally, the method 40' includes a sterilization step 50. In one embodiment, radiation is used to sterilize the contact lens 10, 20, which preferably oxidizes the contact lens surfaces and advantageously further improves the wettability (i.e., reduces the contact angle) of the contact lens 10, 20. In one embodiment, electron beam (E-beam) radiation is used to sterilize the contact lens 10, 20. For example, the contact lens 10, 20 can be sterilized with E-beam radiation while in a saline solution, which can further reduce the contact angle of the contact lens 10, 20 and therefore provide improved hydrophilicity. In one embodiment, an E-beam radiation dosage of between about 20 kGy and about 30 kGy is used. In another embodiment, an E-beam radiation dosage of between about 22.5 kGy and about 27.5 kGy is used. In still another embodiment, an E-beam radiation dosage of about 25 kGy is used. In one embodiment, the contact lens 10, 20 is stored for a predetermined period following irradiation. In one embodiment, the contact lens 10, 20 is stored prior to use for a period of at least about six months following radiation treatment. Any suitable E-beam accelerator can be used. However other suitable radiation types can be used to sterilize the contact lens 10, 20, such as UV radiation, gamma radiation, or other low or high energy radiation types. In one embodiment, a gamma radiation dosage of between about 4 kGy and about 40 kGy can be used. In another embodiment, a gamma radiation dosage of at least about 17 kGy is used. In still another embodiment, a gamma radiation dosage of at least about 25 kGy is used. Any suitable gamma-ray generator can be used. Additionally, other sterilization methods can be used.

In one embodiment, the contact lens 10, 20 is sterilized before it is exposed to the chemical agent 34. In another embodiment, the contact lens 10, 20 is sterilized while exposed to the chemical agent 34. In still another embodiment, the contact lens 10, 20 is sterilized after it has been exposed to the chemical agent 34.

Advantageously, the hydrolysis of the substantially rigid portion 12, 22 of the contact lens 10, 20 provides a contact lens with improved and long-lasting wettability. In one embodiment, the treated contact lens 10, 20 has a contact angle of less than about 65° degrees. In another embodiment, the treated contact lens 10, 20 has a contact angle of less than about 40°. In another embodiment, the treated contact lens 10, 20 has a contact lens angle of less than about 20°. In still another embodiment, the treated contact lens 10, 20 has a contact angle of about zero degrees (e.g., spreading).

Advantageously, the treatment of the contact lens 10, 20 material provides improved wettability (e.g., reduced contact angle) that remains substantially constant over a period of time, providing for a contact lens that is more comfortable to wear. In one embodiment, the surface treatment of the contact lens 10, 20 provides a contact lens with permanent improved wettability. In one embodiment, the contact angle of the contact lens material remains substantially constant for a period of at least about two months. In another embodiment, the contact angle of the contact lens material remains substantially constant for a period of at least four months. In still another embodiment, the contact angle of the contact lens material remains substantially constant for a period of at least about six months. In yet another embodiment, the contact angle of the contact lens material remains substantially constant for a period of at least about eight months. In still another embodiment, the contact angle of the contact lens material remains substantially constant for a period of at least about one year.

The contact angle of the contact lens 10, 20 can be measured using any suitable system. In a preferred embodiment, the contact angle is measured using a sessile drop method. In another embodiment, the contact angle is measured using a captive-bubble method. In still another embodiment, the contact angle is measured using a pendant drop method. In one preferred embodiment, the contact angle is measured using a video-based optical contact measuring system, such as the OCA-20 contact angle analytical system with software modules SCA20 and SCA22 manufactured by DataPhysics Instruments GmbH of Germany.

The OCA-20 system has multiple capabilities for performing direct surface tension measurements of liquid via a pendant drop method and is also capable of many other measurements, such as sessile drop method for static & dynamic contact angles, surface energy calculation for any solid substrate at any temperature, upward pendant drop method for interfacial tensions, and a Contact Lamella Method for direct optical surface tension measurement for highly viscous liquid simples including polymer melts.

In one embodiment, the contact angle measurement method includes taking the contact lens 10, 20 out of a container and placing the contact lens 10, 20 on a sample stage at ambient temperature conditions of about 23° C. Approximately 30 seconds after taking the contact lens 10, 20 out of the container, a water drop is dosed on the contact lens surface for contact angle measurement. In one embodiment, the water drop dosed on the contact lens surface has a fixed volume of about 3 $\mu$l. The drop is preferably formed at a tip of a dosing needle at a controlled dosing rate of about 5 $\mu$l/sec. In one preferred embodiment, the drop is transferred onto the contact lens surface by moving the sample stage upward toward the drop. Preferably, the entire dosing process is recorded using an automatic video recording function so as to capture the initial contact between the drop and the contact lens surface and any subsequent static or dynamic behavior of the wetting process. In a preferred embodiment, about 10 seconds of images are captured during the dosing process using a recording rate of at least about 5 images/second, during which the contact angle is calculated for each image using Laplace-Young and Ellipse algorithms. In another embodiment, the recording rate is about 50 images/second. The static contact angle of the contact lens 10, 20 is then reported for each image. In one preferred embodiment, the contact angle measurement process, including the dosing process, is repeated for a given contact lens 10, 20 a number of times to ensure consistency of measurement. In one embodiment, the contact angle measurement process is repeated three times for a given contact lens 10, 20 sample.

In one embodiment, the contact angle of the contact lens 10, 20 is measured intermittently over a period of time. In one embodiment, following treatment with the solution 32 and/or E-beam radiation, the contact angle of the contact lens 10, 20 can be measured using any of the processes discussed above. The contact lens 10, 20 can then be stored for a period of about six months, after which the contact angle of the contact lens 10, 20 can again be measured using the same process. In another embodiment, the contact angle of the contact lens 10, 20 is measured about one year following treatment with the solution 32 and/or E-beam radiation.

Although this invention has been disclosed in the context of a certain preferred embodiment and examples, it will be understood by those skilled in the art that the present invention extends beyond the specifically disclosed embodiments to other alternative embodiments and/or uses of the invention and obvious modifications and equivalents thereof. For example, though the embodiments discussed above are directed to the surface treatment of contact lenses to thereby improve their wettability, one of ordinary skill in the art will recognize that the embodiments above can be used to improve the wettability of other articles that comprise of a hydrophobic material, and their use is not limited to contact lenses. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Additionally, the contact lens disclosed herein can have more or less features than those disclosed and still fall within the scope of the invention. Accordingly, it should be understood that various features and aspects of the disclosed embodiments can be combined with or substituted for one another in order to form varying modes of the disclosed invention. Further, by listing method steps in a particular order within a claim, no intention is made to limit the scope of the claim to that particular order. Additionally, the methods discussed herein for improving the hydrophilicity of contact lenses may include more or less steps than those disclosed and still fall within the scope of the invention. Thus, it is intended that the scope of the present invention herein disclosed should not be limited by the particular disclosed embodiments described above, but should be determined only by a fair reading of the claims that follow.

What is claimed is:

1. A contact lens, comprising:
   a substantially rigid portion comprising a polymeric material, the polymeric material comprising a hydrophilic hydrolyzed surface comprising carboxylic acid, carboxylate and hydroxyl groups, the surface having a contact angle of about 65 degrees or less.

2. The contact lens of claim 1, further comprising a substantially flexible peripheral portion coupled to the substantially rigid portion at a junction.

3. The contact lens of claim 1, wherein the contact angle is about 40 degrees or less and remains substantially constant for a period of about six months or more.

4. The contact lens of claim 1, wherein the contact angle is about zero degrees.

5. The contact lens of claim 4, wherein the contact angle remains substantially constant over a period of about six months or more.

6. The contact lens of claim 1, wherein the substantially rigid portion has a Dk greater than about $30 \times 10^{-11}$ [$cm^3$/sec][ml $O_2$/ml mm Hg].

7. The contact lens of claim 1, wherein the polymeric material comprises a polymer selected from the group consisting of a polystyrene, a poly(fluoro-siloxane acrylate) and a poly(fluoro-siloxane styryl acrylate).

8. A contact lens, comprising:
   a substantially rigid portion comprising a material selected from the group consisting of a polystyrene, a poly(fluoro-siloxane acrylate) and a poly(fluoro-siloxane styryl acrylate), the material comprising a hydrolyzed surface comprising carboxylic acid, carboxylate and hydroxyl groups, the surface having a contact angle of 65 degrees or less,
   wherein the contact angle remains substantially constant over a period of about six months or more.

9. The contact lens of claim 8, wherein the substantially rigid portion has a Dk greater than about $30 \times 10^{-11}$[$cm^3$/sec][ml $O_2$/ml mm Hg].

10. A contact lens, comprising:
    a substantially rigid central portion with a Dk greater than about $30 \times 10^{-11}$[$cm^3$/sec][ml $O_2$/ml mm Hg], the substantially rigid central portion comprising a polymeric material, the polymeric material comprising a hydrolyzed surface comprising carboxylic acid, carboxylate and hydroxyl groups, the surface having a contact angle of 65 degrees or less; and
    a substantially flexible peripheral portion coupled to the substantially rigid central portion at a junction.

11. The contact lens of claim 10, wherein the contact angle remains substantially constant for a period of about six months or more.

12. The contact lens of claim 10, wherein the polymeric material comprises a polymer selected from the group consisting of a polystyrene, a poly(fluoro-siloxane acrylate) and a poly(fluoro-siloxane styryl acrylate).

13. The contact lens of claim 10, wherein the contact angle is about zero degrees.

14. The contact lens of claim 13, wherein the contact angle remains substantially constant for a period of at least about twelve months.

* * * * *

UNITED STATES PATENT AND TRADEMARK OFFICE
CERTIFICATE OF CORRECTION

| | | |
|---|---|---|
| PATENT NO. | : 7,329,001 B2 | Page 1 of 1 |
| APPLICATION NO. | : 11/265780 | |
| DATED | : February 12, 2008 | |
| INVENTOR(S) | : Ramazan Benrashid, Ali Dahi and Jerome A. Legerton | |

It is certified that error appears in the above-identified patent and that said Letters Patent is hereby corrected as shown below:

At column 3, line 55, please delete "However" and insert -- However, --, therefor.

At column 5, line 15, please delete "bout" and insert -- about --, therefor.

At column 8, line 7, please after "65°" delete "degrees".

Signed and Sealed this

Twenty-sixth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,329,001 B2
APPLICATION NO. : 11/265780
DATED : February 12, 2008
INVENTOR(S) : Ramazan Benrashid, Ali Dahi and Jerome Legerton It is certified that error appears in the above-identified patent and that said Letters Patent is hereby corrected as shown below:

In the Claims

At column 10, line 20, in Claim 6 please delete "$[cm^3/sec][ml\ O_2/ml\ mm\ Hg]$." and insert -- $[cm^2/sec][ml\ O_2/ml\ mm\ Hg]$. --, therefor.

At column 10, line 37, in Claim 9 please delete "$[cm^3/sec][ml\ O_2/ml\ mm\ Hg]$." and insert -- $[cm^2/sec][ml\ O_2/ml\ mm\ Hg]$. --, therefor.

At column 10, line 41, in Claim 10 please delete "$[cm^3/sec][ml\ O_2/ml\ mm\ Hg]$." and insert -- $[cm^2/sec][ml\ O_2/ml\ mm\ Hg]$. --, therefor.

Signed and Sealed this
Twenty-ninth Day of April, 2014

Michelle K. Lee
*Deputy Director of the United States Patent and Trademark Office*